United States Patent
Martensson

(10) Patent No.: US 8,757,979 B2
(45) Date of Patent: Jun. 24, 2014

(54) ROTOR ELEMENT AND METHOD FOR PRODUCING THE ROTOR ELEMENT

(75) Inventor: Hans Martensson, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 699 days.

(21) Appl. No.: 12/443,896

(22) PCT Filed: Oct. 5, 2006

(86) PCT No.: PCT/SE2006/001131
§ 371 (c)(1),
(2), (4) Date: Apr. 1, 2009

(87) PCT Pub. No.: WO2008/041889
PCT Pub. Date: Apr. 10, 2008

(65) Prior Publication Data
US 2010/0021305 A1 Jan. 28, 2010

(51) Int. Cl.
*F01D 5/22* (2006.01)
(52) U.S. Cl.
USPC .............................. 416/190; 416/192; 310/51
(58) Field of Classification Search
CPC ....... F01D 17/162; F01D 25/06; F01D 25/04; F01D 25/164; F01D 5/26; F01D 25/168
USPC .............. 416/186 R, 190–192, 193 A, 193 R; 310/51, 58, 62
See application file for complete search history.

(56) References Cited

U.S. PATENT DOCUMENTS

| | | | |
|---|---|---|---|
| 3,847,506 A | 11/1974 | Straniti | |
| 4,097,192 A | 6/1978 | Kulina | |
| 5,511,948 A * | 4/1996 | Suzuki et al. | 416/191 |
| 5,763,968 A * | 6/1998 | Hayashi et al. | 310/51 |
| 6,264,012 B1 * | 7/2001 | Yamazaki et al. | 188/74 |
| 6,827,551 B1 | 12/2004 | Duffy et al. | |
| 7,727,073 B2 * | 6/2010 | Matsuo | 464/99 |
| 2002/0067991 A1 | 6/2002 | Montgomery et al. | |
| 2002/0072316 A1 * | 6/2002 | Kim | 451/343 |
| 2006/0250033 A1 * | 11/2006 | Vasilescu et al. | 310/62 |

FOREIGN PATENT DOCUMENTS

WO   WO 2004106747 A1 * 12/2004

OTHER PUBLICATIONS

International Search Report for corresponding International Application PCT/SE2006/001131.

* cited by examiner

*Primary Examiner* — H Tsai
(74) *Attorney, Agent, or Firm* — WRB-IP LLP

(57) ABSTRACT

A rotor element includes at least one irregularity with regard to rotational properties in its circumferential direction and the irregularity is positioned so as to separate the mechanical natural frequencies of the rotor element.

30 Claims, 7 Drawing Sheets

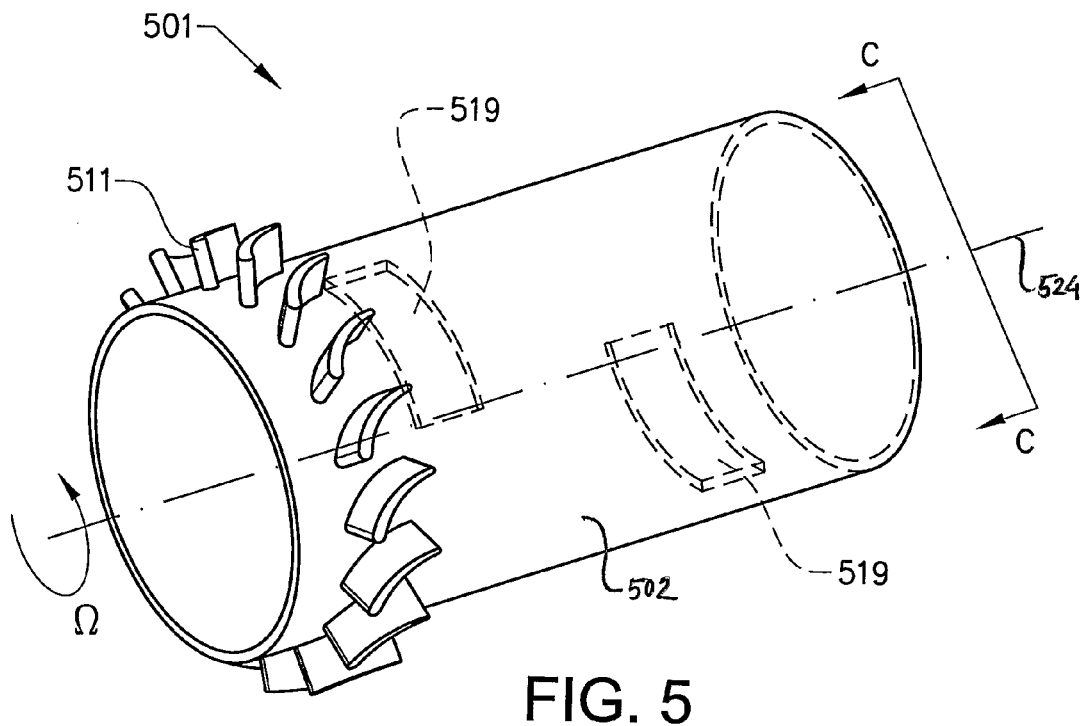
FIG. 5
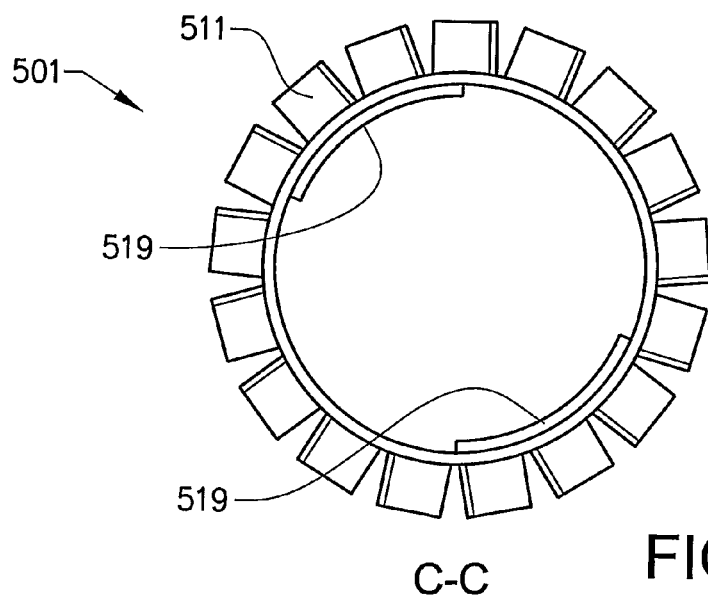
C-C   FIG. 6

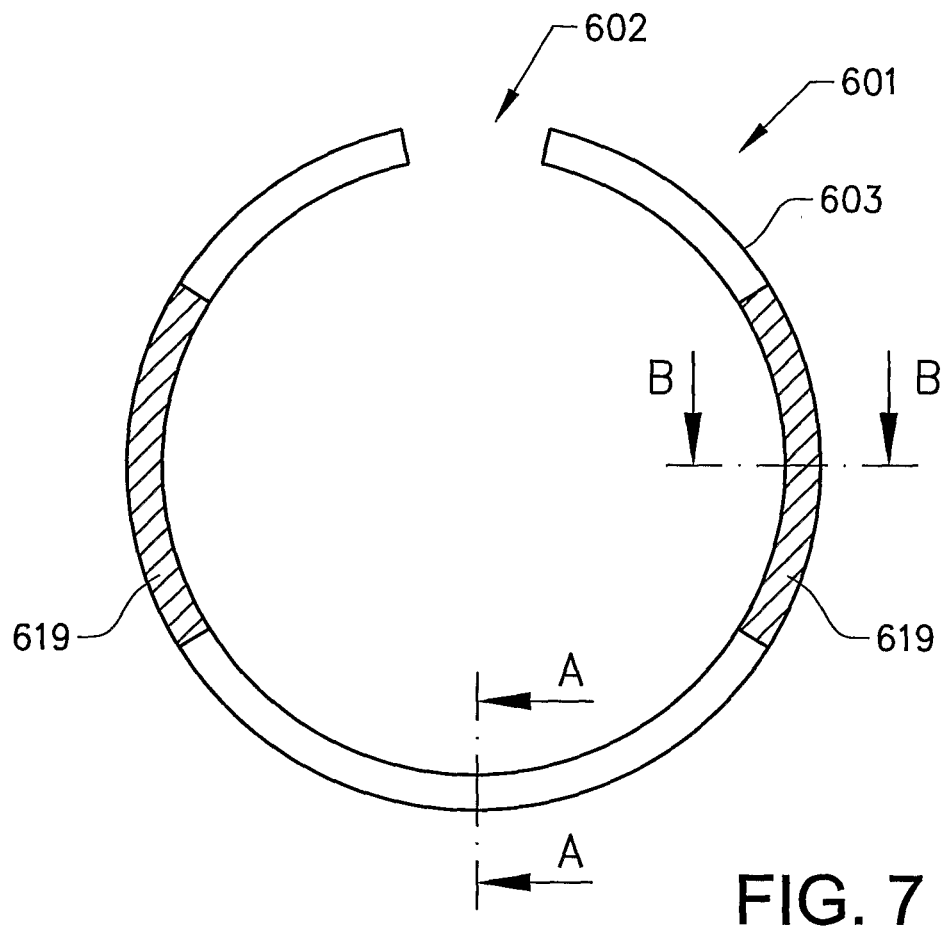
FIG. 7
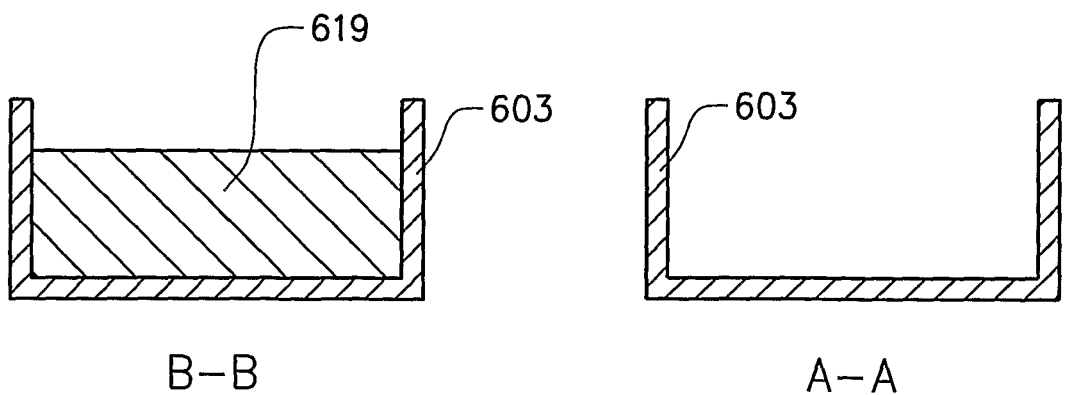
B-B
FIG. 8
A-A
FIG. 9

ROTOR ELEMENT AND METHOD FOR PRODUCING THE ROTOR ELEMENT

BACKGROUND AND SUMMARY

The present invention relates to a rotor element and a method for producing the rotor element. The invention is primarily directed to a disk-shaped rotor comprising a plurality of circumferentially spaced rotor blades for a high-speed application.

The invention may be applied in a turbine rotor in an axial flow turbomachine, for example in a turbine of a turbopump for liquid rocket engines or in the fan of a high by-pass ratio turbofan aircraft engine. The rotor blades, like other high-speed aerofoils, are subject to an aeroelastic instability phenomenon known as flutter. Flutter is an aerodynamically self excited blade vibration problem which may arise when aerodynamic forces destabilizes the natural resonance of the turbine rotor during operation. Flutter is more likely to take place at higher aerodynamic loads and flow speeds.

In one type of bladed disk (blisk), two equal eigenmodes exist, for which identical but orthogonal mode shapes with equal natural frequency are separated by 90°. The natural frequencies interact during operation in a mutually amplifying manner, wherein flutter phenomena are encountered.

Flutter is undesirable because it causes extra stresses in the rotor. In turn, this may necessitate otherwise unnecessary rotational speed restrictions in order to ensure that the stresses in the rotor do not exceed desirable limits. Such restrictions prevent the full performance of the rotor being realized, with deleterious effects on available thrust and specific fuel consumption of the engine.

One known way of reducing the effect of flutter is to raise the natural frequencies or modifying modes so that aerodynamic stability is achieved. It is also known to add dampers, in the form of a ring damper or discrete dampers under the platform of the blades. An added damper has the effect of rubbing against the rotor body, wherein damping is achieved.

It is desirable to achieve a rotor element with improved characteristics with regard to inhibiting flutter during operation. Further, it is desirable to combat flutter and improving the aeroelastic stability of a rotor.

According to an aspect of the present invention, a rotor element comprises at least one irregularity with regard to rotational properties in its circumferential direction and that the irregularity is positioned so as to separate the mechanical natural frequencies of the rotor element.

Thus, the aeroelastic connection between the inherent natural frequencies of the rotor is disturbed. By virtue of the irregularity, the natural frequencies of the rotor will be separated so that at least one of them end up at a different natural frequency in relation to the inherent natural frequency. According to one example, a first of the natural frequencies is heavily effected and the other natural frequency is unaffected. Thus, the interaction between the natural frequencies of the rotor is disturbed.

In other words, the irregularity is adapted to effect the mechanical natural frequencies of the rotor, which is distinct from a conventional damper, which does not primarily seek to affect the mechanical natural frequencies of the rotor but instead only damps the magnitude of the natural frequencies. More particularly, by means of a damper, the internal relationship between the natural frequencies is not affected. Further, the interaction between the natural frequencies of the rotor is unaffected.

The term "rotor element" should be interpreted in a wide way, covering not only a rotor which is rotated in for example an aircraft engine in order to effect a gas flow, but also covering a separate element, such as a damper, which is attached to such a rotor. In both cases, the irregularity will effect the rotor in such a way that its natural frequencies are separated.

According to one aspect of the invention, the irregularity is formed in that different sectors in a circumferential direction of the rotor element has different mass and/or rigidity. In this way, the irregularity with regard to mass and/or rigidity causes the separation of the mechanical natural frequencies of the rotor element.

A "sector" is defined as a part of the rotor element defined between two planes which intersect in a central imaginary rotor element axis and which extend in an axial direction of the rotor element. Since the rotor element is circular, the sector has an arched outer periphery. In other words, in a plane perpendicular to the central imaginary rotor element axis, each sector is defined between two straight lines which intersect in the central imaginary rotor element axis and an outer arched line.

According to a further aspect of the invention, the irregularity is formed in that different sectors in a circumferential direction of the rotor element has different material thickness and/or composition and/or configuration. This may be achieved in several ways, for example by forming a rotor element body in a uniform material with different thickness in different sectors or that different sectors comprises different materials or a combination thereof.

According to a further aspect of the invention, the irregularity is positioned in a rotor element body portion of the rotor element. Thus, the rotor element body portion is modified so as to separate the inherent natural frequencies. This solution is distinct from separating the natural frequencies of different rotor blades. Thus, the invention is applicable to blisks, bladed disks and drums, and rotors without blades such as seals.

It is also desirable to achieve a method for producing a rotor with improved characteristics with regard to inhibiting flutter during operation.

According to an aspect of the present invention, the rotor element is formed with at least one irregularity with regard to rotational properties in its circumferential direction and positioning the irregularity so as to separate the mechanical natural frequencies of the rotor element.

According to one aspect of the invention, the method comprises the steps of forming the rotor element with an excess of material in at least one sector in a circumferential direction of the rotor element in a first step and removing, part of said excess of material by machining in a second step. This is preferably achieved by forming the rotor element by means of turning a work piece in the first step and by milling or grinding off the excess material in the second step.

The rotor configuration may be optimized for applications to a given turbine rotor by use of techniques and mathematical analysis which are within the skill of the art.

Further advantageous embodiments and advantages of the invention will be apparent from the following description, and drawings.

BRIEF DESCRIPTION OF THE DRAWINGS

The invention will be explained below, with reference to the embodiments shown on the appended drawings, wherein FIG. 5-6 show a rotor element according to a fifth embodiment in a schematic perspective view and in a side view, respectively, FIG. 7-9 show a rotor element in the form of a damper according to a sixth embodiment of the invention.

DETAILED DESCRIPTION

Figure 1:
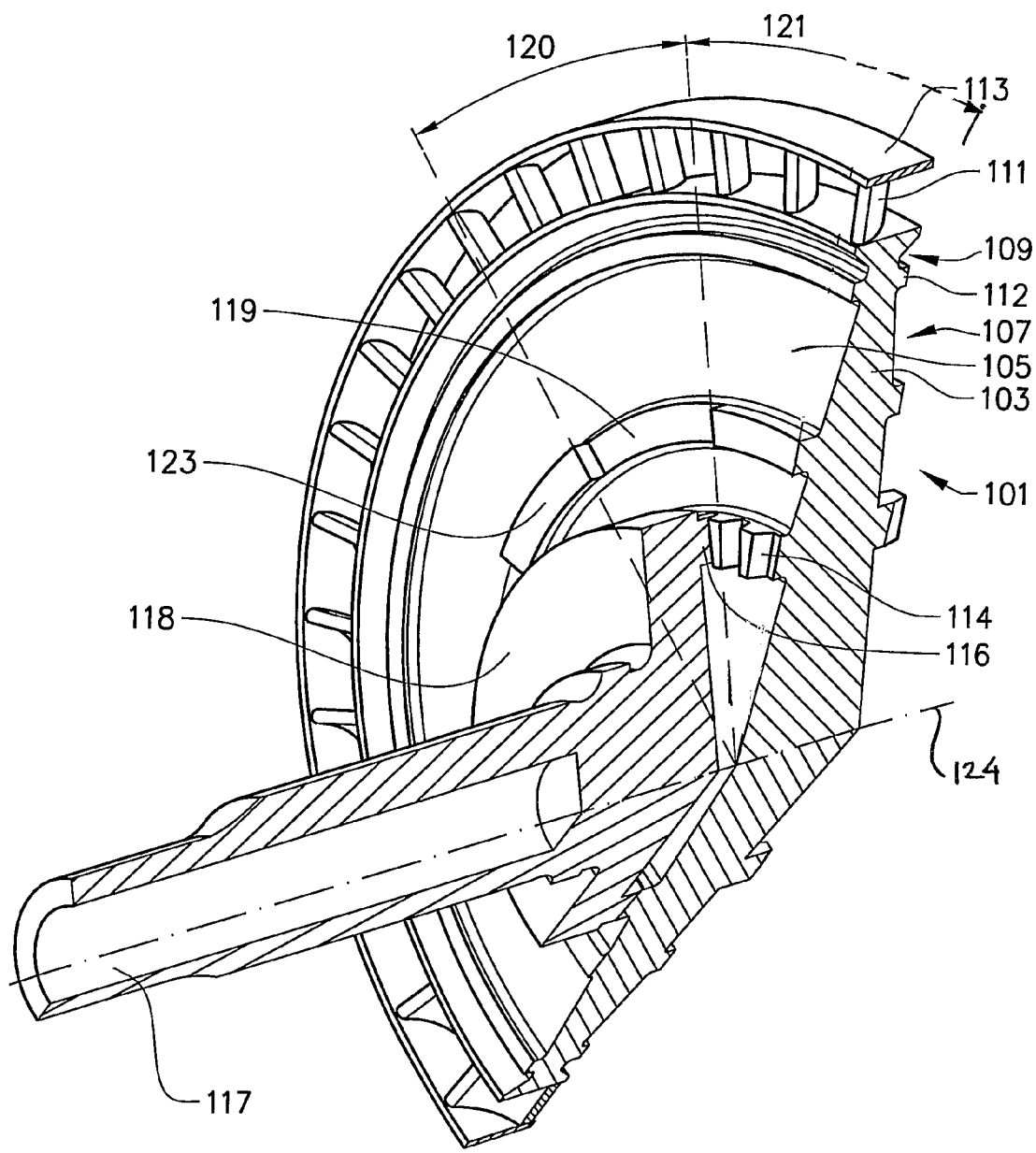
FIG. 1 shows a rotor element according to a first, embodiment, in a partly cut perspective view.

FIG. 1 shows a rotor 101 for a high-speed application according to a first embodiment. The rotor 101 is adapted for application as a compressor or turbine in a gas turbine engine, and preferably in an aircraft jet engine. The rotor 101 is disk-shaped comprising a substantially flat rotor body portion (web) 103 with two opposite disk sides 105,107. The disk sides 105,107 define the lateral configuration of the disk. An elongated, annular platform 109 is formed at the radially outer end of the rotor body portion 103. The platform 109 comprises a mounting face and a pair of lateral extensions, each of which extends laterally beyond the disk sides 105,107 respectively.

A series of circumferentially spaced blades (vanes) 111 are attached to the blade platform and extend radially outwardly from the mounting face of the platform 109. Thus, the blades 111 are arranged at the periphery of the rotor 101. A blade roof 113 is arranged radially outside the blades 111 and secured to the blades. A balancing flange 112 extend from the rotor body portion 103.

Further, the rotor 101 comprises a connection means 114 for engagement with a driving means 116. The connection means 114 comprises an annular toothed structure (splines) extending axially from a disk side 105. The driving means 116 comprises an annular toothed stricture (splines) extending axially from a connection disc 118, which in turn is rotationally rigidly connected to a drive shaft 117.

The rotor 101 comprises at least one irregularity 119 with regard to rotational properties in its circumferential direction. The irregularity 119 is positioned so as to separate the mechanical natural frequencies of the rotor. Thus, the rotor 101 has an asymmetric distribution. The irregularity 119 is configured so as to separate the mechanical natural frequencies of the rotor. Further, the irregularity 119 is formed in that different sectors 120,121 in a circumferential direction of the rotor have different mass and/or rigidity. The sectors 120,121 are defined by circumferentially separated imaginary limit lines and extend over equal angles in the circumferential direction of the rotor.

The irregularity 119 is formed in the web 103 of the rotor 101. The sectors 120,121 with different properties are positioned radially inside of the blades 111. Thus, the irregularity 119 is formed separate from the blades 111. More specifically, the rotor 101 has partially different material thickness in the different sectors 120,121. Especially, the rotor 101 has different material mass and rigidity in the different sectors 120,121.

This is achieved in that the rotor 101 comprises a projection in the form of an annular portion 123 (flange) extending around a central rotor axis and projecting from one side of the rotor. More specifically, the annular portion 123 projects in an axial direction of the rotor 101 from one side of the rotor. Further, the annular portion 123 is circumferentially interrupted by at least one cavity 119, which forms the irregularity. By designing and positioning the cavity/-ies 119 circumferentially spaced, each sector 120 having a cavity 119 will have a different rotational property in relation to a neighbouring sector 121, which is free of any such cavity.

The annular portion 123 is arranged about halfway between a central rotor axis 124 and the row of blades 111. By arranging the annular projection 123 on a smaller radius, an increased rigidity of the rotor 101 is achieved.

The annular portion 123 is preferably unitary with the rotor body. Further, the annular portion 123 forms a discontinuous ring. According to an alternative, the annular portion may be formed by an arched part of a ring. By forming the rotor 101 with the annular portion in the form of a complete circular ring or at least close to a full ring (a discontinuous ring, see FIG. 1) increased rigidity of the rotor is achieved. According to the alternative with discrete annular parts, increased mass is achieved in the particular sector.

Thus, a rotor portion comprising the irregularity 119 is rotationally rigidly arranged with regard to the rotor 101. More particularly, the rotor portion comprising the irregularity 119 is formed in a one-piece unit with the rotor 101.

Figure 2:
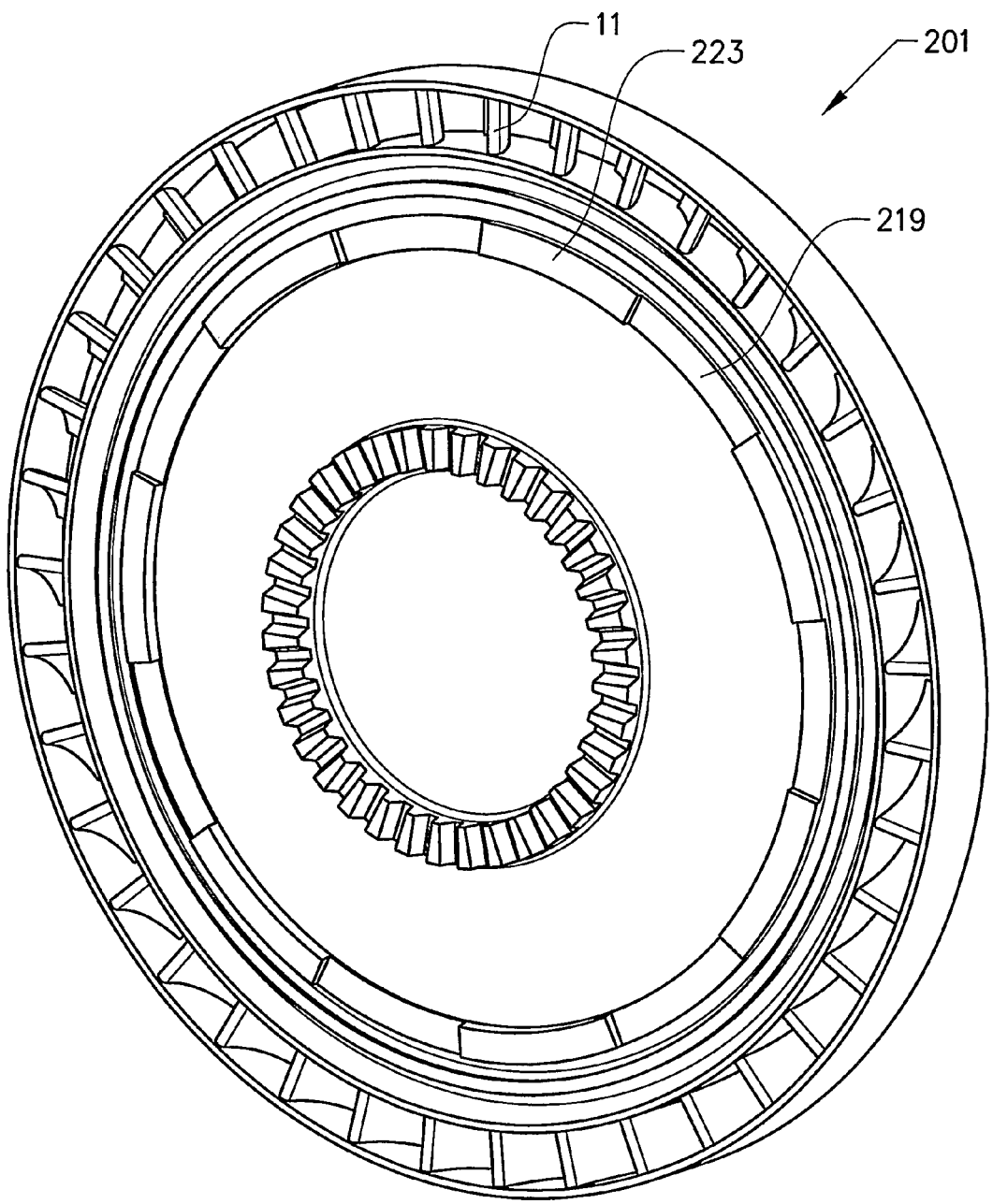
FIG. 2-4 show a rotor element according to a second, third and fourth embodiment, respectively, in a perspective view.

FIG. 2 shows a second embodiment of a rotor 201. Only the differencies in relation to the embodiment of FIG. 1 will be described below. The rotor 201 comprises an annular portion 223 (flange) which forms a discontinuous ring, wherein a cavity 219 in the ring forms the irregularity. The annular portion 223 is arranged in the vicinity of the row of blades 111, ie on a relatively large radial distance from a central rotor axis. By arranging the annular projection 123 on a larger radius, it more has the effect of a dead mass with regard to rigidity.

Figure 3:
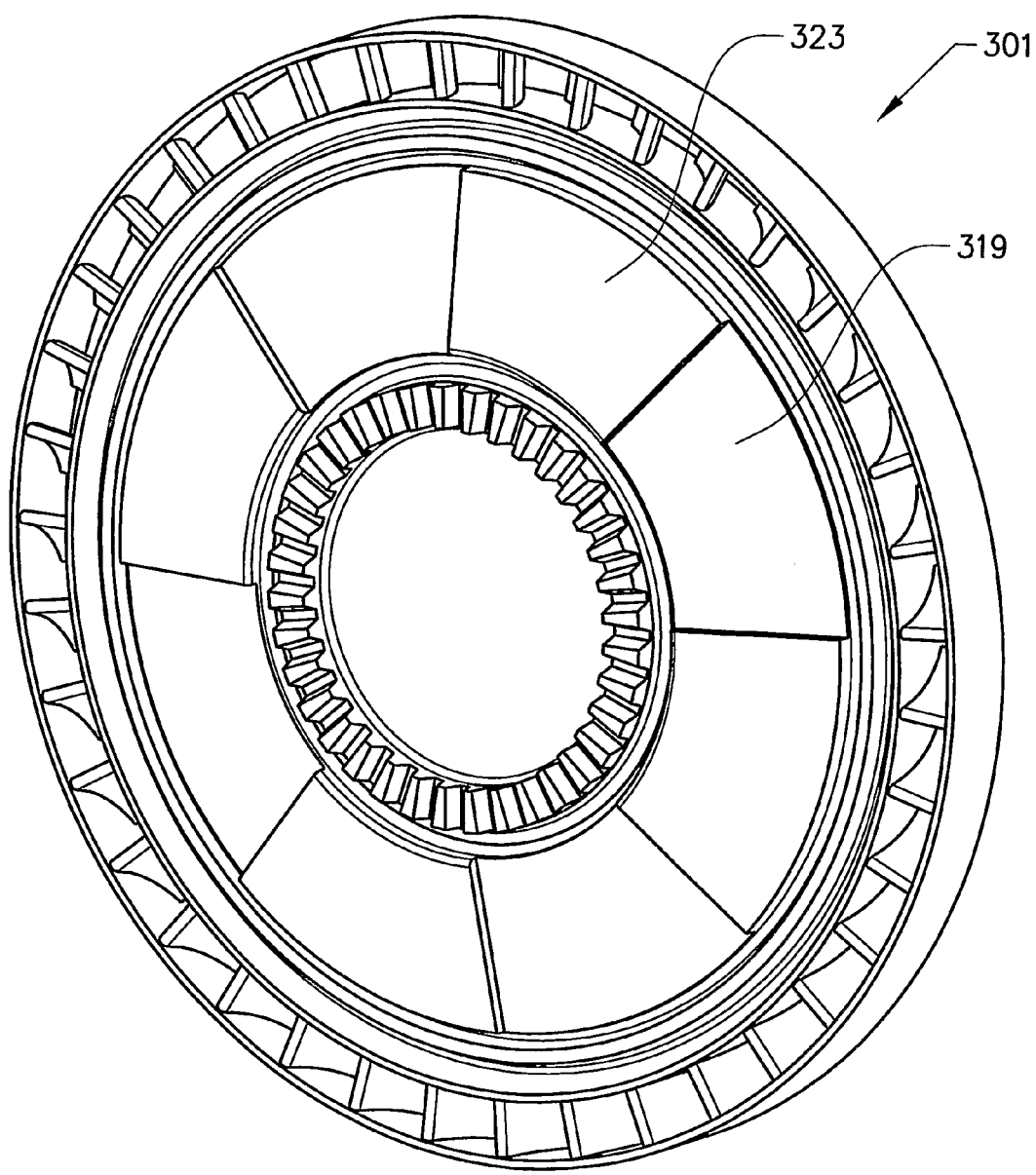

FIG. 3 shows a third embodiment of a rotor 301. Only the differencies in relation to the embodiment of FIG. 1 will be described below. The rotor 201 comprises an annular portion 323 which forms a discontinuous ring, wherein a cavity 319 in the ring forms the irregularity.

The annular portion 323 has a relatively large radial extension. Thus, the annular portion 323 is relatively wide in a radial direction of the rotor 301. The cavity extends over the complete annular portion 323 in the radial direction. More particularly, the cavity 319 forms a recessed circular sector in the wide annular portion. According to the shown example, the annular portion extends over about 50% of the radial extension of the rotor.

Figure 4:
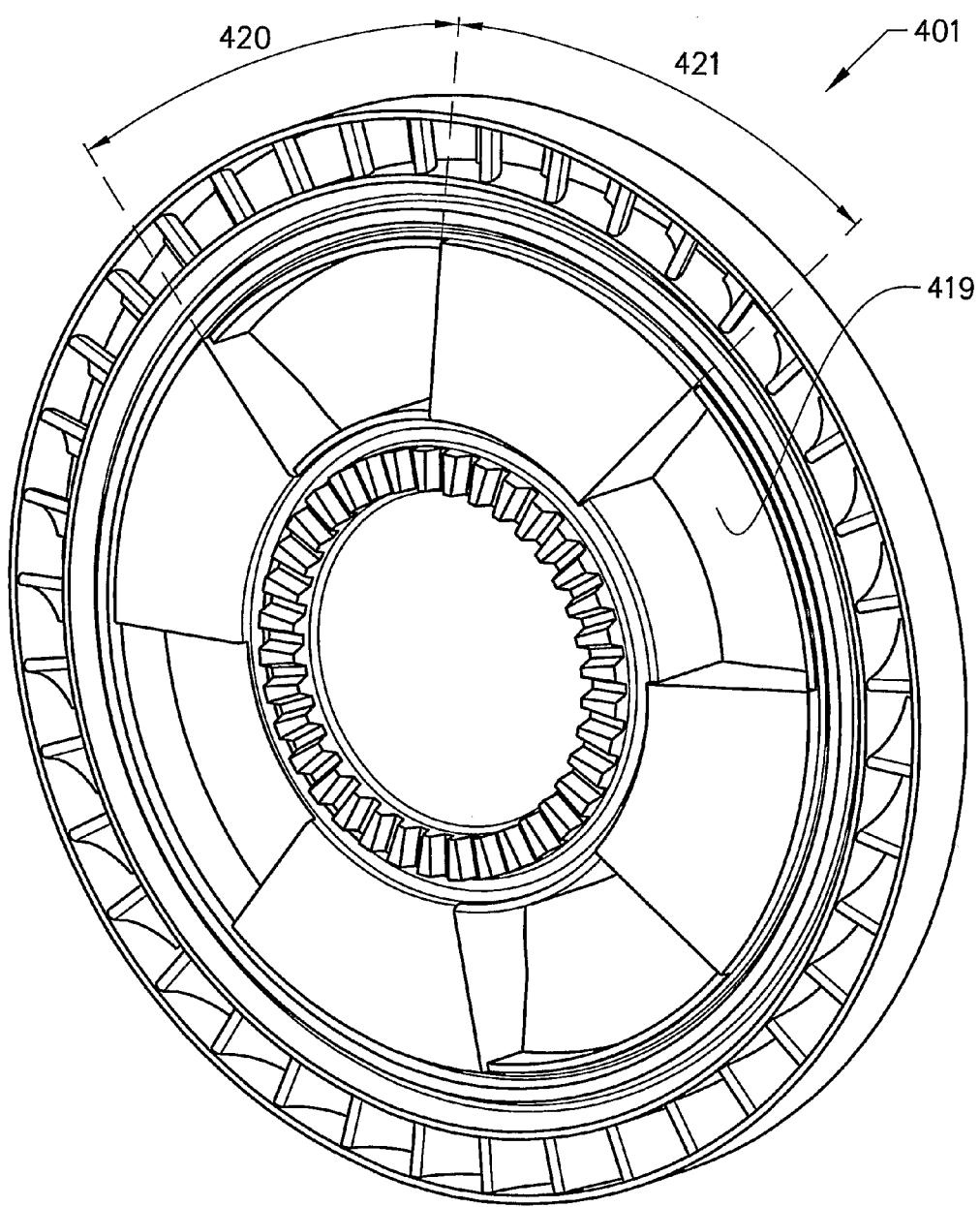

FIG. 4 shows a fourth embodiment of a rotor 401. Only the differences in relation to the embodiment of FIG. 3 will be described below. An irregularity 419 is formed in that at least one sector 421 of a plurality of sectors 420 in a circumferential direction of the rotor 401 has an opening 419 extending in an axial direction of the rotor throughout the rotor. Since the opening 419 forms a circular sector and runs throughout the rotor 401, the rotor comprises a plurality of circumferentially spaced radial spokes 422. In other words, the rotor 401 has a spoked structure. Thus, different sectors 420,421 are arranged with different configuration in a circumferential direction of the rotor. The irregularity may be formed in that the spokes are irregularly spaced in the circumferential direction.

FIG. 5-6 show a fifth embodiment of a rotor 501. The rotor 501 forms a rotationally symmetric body. The rotor 501 has a circular-cylindrical shape with a substantial extension in an axial direction. For ease of presentation, the rotor forms a straight cylindrical shape. An envelope surface 502 of the rotor is however normally curved. According to an alternative, the cylindrical rotor may have a conical shape. An envelope surface 502 of the rotor is however normally curved. A series of circumferentially spaced blades 511 are attached to the rotor 501 and extend radially outwardly from the envelope surface of the rotor.

The rotor 501 comprises at least one irregularity 519 with regard to rotational properties in its circumferential direction.

The irregularity 519 is achieved in that different sectors in a circumferential direction of the rotor 501 has different material thickness. More particularly, a material layer 519 is added to the rotor body, wherein the rotor partially has a thicker material thickness. The layers are added to an inside of the cylindrical rotor 501. Further, the rotor 501 comprises two thicker rotor portions 519, which are arranged at a distance from each other in an axial direction 524 of the rotor and on opposite positions inside the cylindrical rotor 501.

FIG. 7 shows a rotor element 601 in the form of a damper in a cross sectional view according to a sixth embodiment of the invention. The damper 601 is an annular structure 603 with an interruption 602. The annular structure has a U-shaped cross section, see FIGS. 8 and 9. FIGS. 8 and 9 show cross sections A-A and B-B of FIG. 1. The damper 601 comprises at least one irregularity 619 with regard to rotational properties in its circumferential direction. The irregularity 619 is achieved in that different sectors in a circumferential direction of the rotor 601 has different material thickness. More particularly, the annular structure is provided with circumferentially spaced portions 619 with added material. The material is added in the U-shaped structure.

Figure 10:
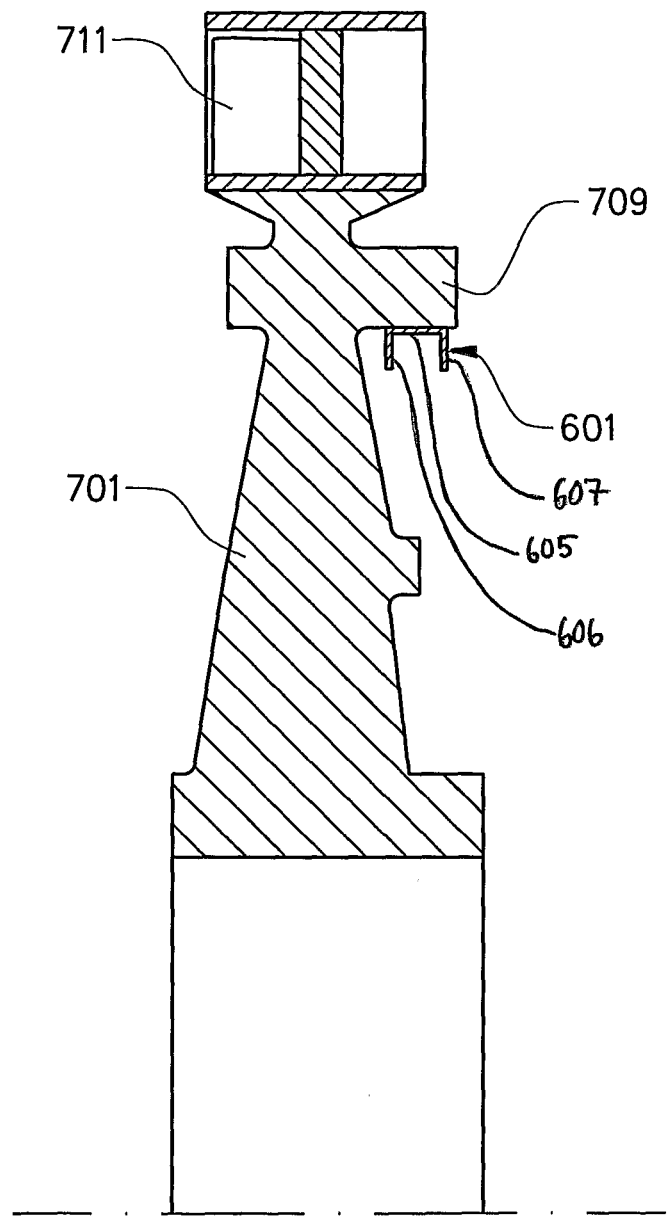
FIG. 10 shows the damper of FIG. 7-9 attached to a rotor.

In FIG. 10, a rotor 701 is schematically disclosed. The damper 601 is attached to the rotor body. More specifically, the damper 601 is attached to an underside of a platform 709 for a row of blades 711. The damper 601 is attached to the rotor via a circumferential groove in the platform in order to prevent it from moving axially. A central portion 605 of the U-shaped damper is attached to the platform 709 and legs 606, 607 extend radially inwards from the central portion 605.

According to an alternative embodiment to the one shown in FIG. 10, the U-shaped damper is configured so that the legs extend radially outwards from the central portion. The rotor comprises a flange extending radially inwards from the underside of the platform and the U-shaped damper is configured to engage with the flange. Thus, the circumferential groove defined by the central portion and the legs of the U-shaped damper is adapted to engage with the projecting flange, preferably in a tight manner.

Below follows a description of methods for producing such rotor elements. The methods will be explained with regard to the first embodiment of the rotor 101 shown in FIG. 1.

The method is characterized by forming the rotor element 101 with at least one irregularity 119 with regard to rotational properties in its circumferential direction and positioning the irregularity 119 so as to separate the mechanical natural frequencies of the rotor element 101. Further, the method comprises forming the irregularity 119 by forming different sectors 120, 121 in a circumferential direction of the rotor element 101 with different mass and/or rigidity. More particularly, the method comprises forming the irregularity 119 by forming different sectors 120, 121 in a circumferential direction of the rotor element 101 with different material thickness and/or composition and/or configuration.

The method comprises the step of forming a rotor element portion comprising the irregularity 119 so that it is rotationally rigidly arranged with regard to the rotor element 101. More particularly, the method comprises the step of forming the rotor element portion comprising the irregularity 119 so that it is formed in a one-piece unit with the rotor element 101.

The method comprises the step of forming the rotor element 101 with an excess of material in at least one sector 120 in a circumferential direction of the rotor element 101 in a first step and removing part of said excess of material by machining in a second step. The cavity 119 will be formed at the position of the removed material. Thus, the method comprises forming the rotor in two consecutive steps. Especially, the method comprises forming the rotor element 101 by means of turning a work piece in the first step so that it comprises the annular projection 123. More particularly, the method comprises forming the rotor element 101 with at least one annular portion 123 extending around a central rotor element axis and projecting in an axial direction of the rotor element from one side 105 of the rotor element 101.

Further, the method comprises milling or grinding off the excess material in the second step, thereby achieving the cavity 119 in the annular projection 123.

Further, the method comprises removing material from the annular portion 123 in at least one sector 120 and thereby circumferentially interrupting the annular portion by at least one cavity 119.

According to an alternative method, see for example FIG. 5, the method comprises forming the rotor element 501 in a first step and adding material in at least one of a plurality of sectors in its circumferential direction in a second step. Especially, the method comprises adding the material by metal deposition in the second step. According to a further alternative method, it comprises adding the material by spraying the material in plasma layers in the second step.

According to a further alternative method, it comprises adding the material by securing a separate rotor element portion 601 to a rotor 701 in the second step, see for example FIG. 10.

According to an alternative to the above described embodiment, there is no annular portion extending from the disk side. Instead at least one of said rotor sectors has a cavity extending in an axial direction of the rotor.

According to an alternative to the above described embodiments, where the rotor is provided with a cavity, the irregularity is formed in that at least one of a plurality of sectors in a circumferential direction of the rotor has a projection extending in an axial direction of the rotor.

According to an alternative to the above described embodiments with different shapes and positions of the rotational property effecting means (projections and/or cavities), the material composition of the disc body, i.e the internal structure of the disc, may be different in different sectors.

According to an alternative (or complement) to the embodiments above, the irregularity with regard to rotational properties can be formed in the roof 113 and/or platform 119 of the rotor.

According to an alternative to the driving connection 114, 116 above, the rotor disk comprises a central through-hole for being drivingly connected to a drive shaft (not shown), preferably via internal splines.

According to an alternative to the above described embodiment, a rotor portion comprising the irregularity is removably connected with the rotor. Such a rotor portion may for example be bolted to the rotor body.

The invention is not in any way limited to the above described embodiments, instead a number of alternatives and modifications are possible without departing from the scope of the following claims. For example, the rotor element may be formed by a sealing.

The invention claimed is:

1. An axial flow rotor element, comprising:
a rotor element body having mechanical frequencies including a first set of mechanical natural frequencies that interact; and
at least one irregularity on the rotor element body, the irregularity being positioned to alter the first set of mechanical natural frequencies so as to disturb interaction between the first set of mechanical natural frequencies and prevent aeroelastic instability caused by interaction between the first set of mechanical frequencies through their dynamical connection with a passing gas flow.

2. Rotor element according to claim 1, wherein the irregularity is formed so that different sectors in a circumferential direction of the rotor element have different mass and/or rigidity.

3. Rotor element according to claim 1, wherein the irregularity is formed so that different sectors in a circumferential direction of the rotor element have different material thickness and/or composition and/or configuration.

4. Rotor element according to claim 1, wherein the irregularity is formed so that at least one of a plurality of sectors in a circumferential direction of the rotor element has a cavity.

5. Rotor element according to claim 1, wherein the irregularity is formed so that at least one of a plurality of sectors in a circumferential direction of the rotor element has an opening extending throughout the rotor element.

6. Rotor element according, to claim 1, Wherein at the irregularity is formed so that at least one of a plurality of sectors in a circumferential direction of the rotor element has a projection.

7. Rotor element according to claim 1, wherein the rotor element comprises at least one annular portion extending around a central rotor axis and projecting from the rotor element, and that the irregularity is formed so that the annular portion is circumferentially interrupted by at least one cavity.

8. Rotor element according to claim 1, wherein the rotor element comprises a plurality of circumferentially spaced radial spokes.

9. Rotor element according to claim 8, wherein the irregularity is formed so that the spokes are irregularly spaced in the circumferential direction.

10. Rotor element according to claim 1, wherein a rotor element portion comprising the irregularity is rotationally rigidly arranged with regard to a rotor element body.

11. Rotor element according to claim 1, wherein a rotor element, portion comprising the irregularity is formed in a one-piece unit with the rotor element.

12. Rotor element according to claim 1, wherein the rotor element is disk-shaped.

13. Rotor element according to claim 1, wherein the rotor element has a circular-cylindrical shape with a substantial extension in an axial direction.

14. Rotor element according to claim 1, wherein the rotor element comprises a plurality of circumferentially spaced rotor blades.

15. Rotor element according to claim 14, wherein the irregularity is positioned radially inside of the blades.

16. Rotor element according to claim 1, wherein the irregularity is positioned in a rotor element body of the rotor element.

17. Rotor element according to claim 1, wherein the rotor element is adapted for a high-speed application.

18. A method for producing a rotor element, comprising
forming a rotor element body having mechanical frequencies including a first set of mechanical natural frequencies that interact; and,
positioning at least one irregularity on the rotor element body to alter the first set of mechanical natural frequencies so as to disturb interaction between the first set of mechanical natural frequencies and prevent aeroelastic instability caused by interaction between the first set of mechanical frequencies through their dynamical connection with a passing gas flow.

19. A method according to claim 18, comprising forming the irregularity by forming different sectors in a circumferential direction of the rotor element with different mass and/or rigidity.

20. A method according to claim 18, comprising forming the irregularity by forming different sectors in a circumferential direction of the rotor element with different material thickness and/or composition and/or configuration.

21. A method according to claim 18, comprising forming a rotor element portion comprising the irregularity so that it is rotationally rigidly arranged with regard to the rotor element body.

22. A method according to claim 18, comprising forming a rotor element portion comprising the irregularity so that it is formed in a one-piece unit with the rotor element.

23. A method according to claim 18, comprising forming, the rotor element with an excess of material in at least one sector in a circumferential direction of the rotor element in a first step and removing part of the excess of material by machining in a second step.

24. A method according to claim 23, comprising forming the rotor element by turning a work piece in the first step.

25. A method according to claim 23, comprising milling or grinding off the excess material in the second step.

26. A method according to claim 18, comprising forming the rotor element with at least one annular portion extending around a central rotor axis and projecting from the rotor element.

27. A method according to claim 26, comprising removing material from the annular portion at least one sector and thereby circumferentially interrupting the annular portion by at least one cavity.

28. A method according to claim 18, comprising forming the rotor element in a first step and adding material in at least one of a plurality of sectors in its circumferential direction in a second step.

29. A method according to claim 28, comprising adding the material by metal deposition in the second step.

30. A method according to claim 28, comprising adding the material by spraying the material in plasma layers in the second step.

* * * * *